UNITED STATES PATENT OFFICE.

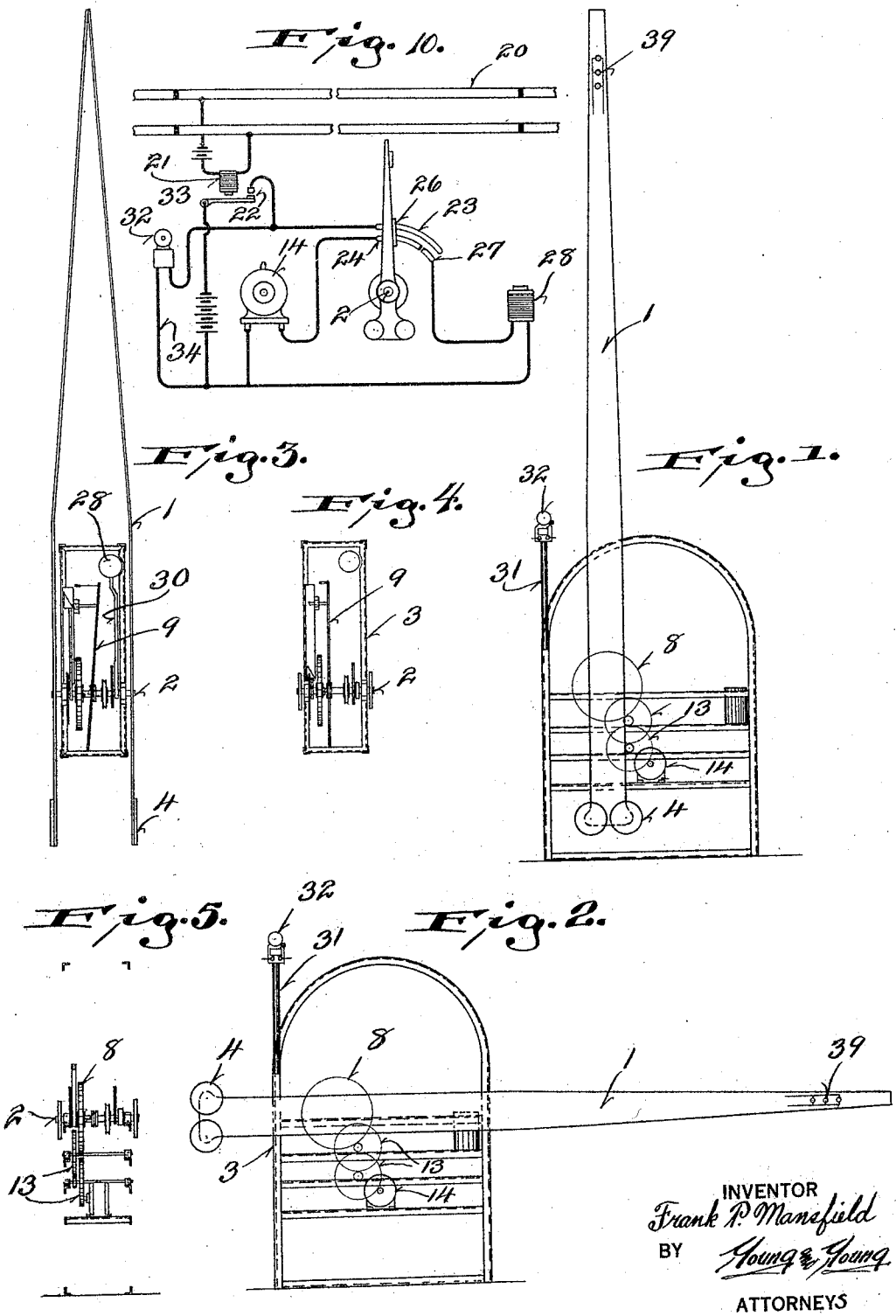

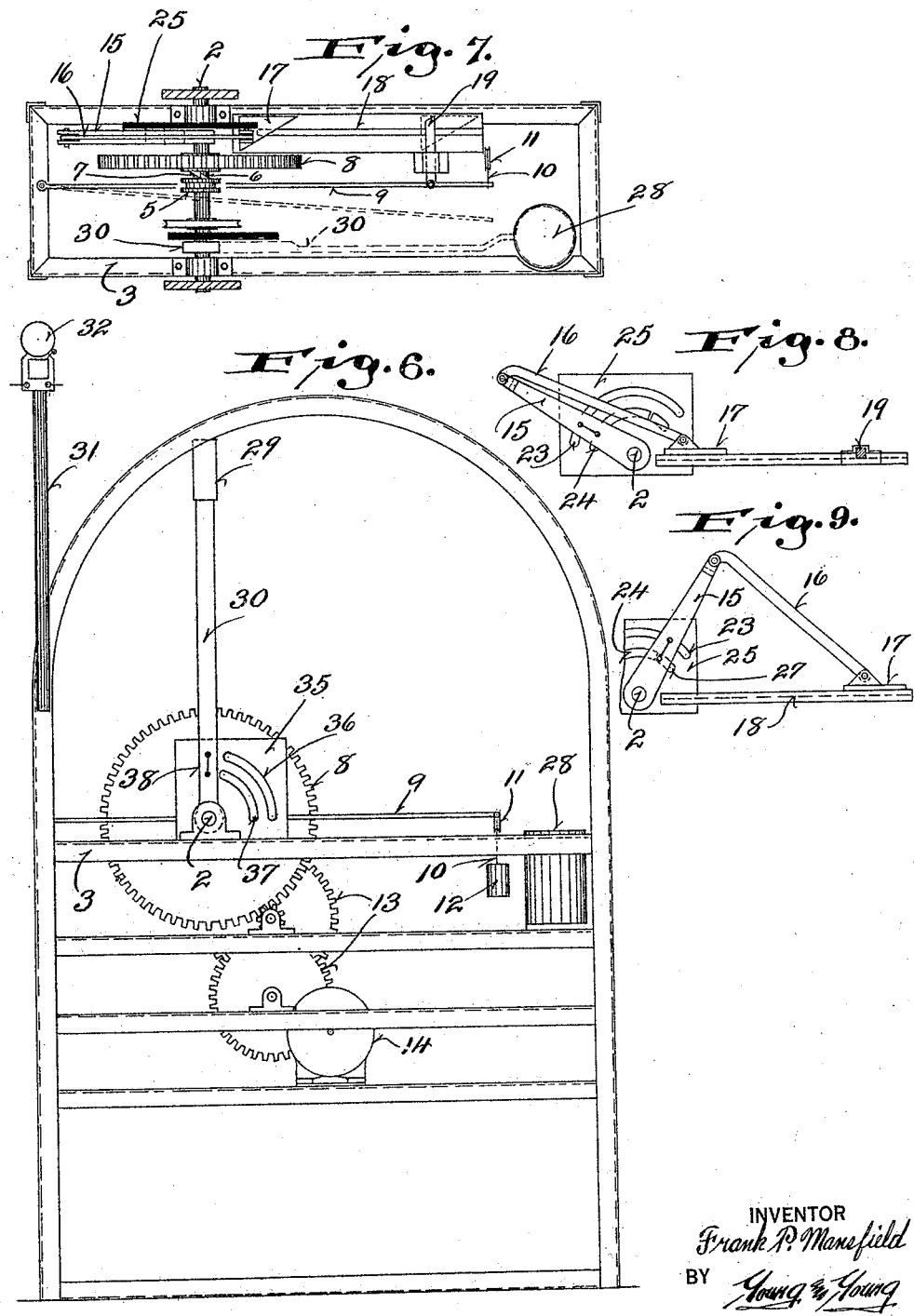

FRANK P. MANSFIELD, OF MILWAUKEE, WISCONSIN.

GATE FOR GRADE CROSSINGS.

1,404,988. Specification of Letters Patent. Patented Jan. 31, 1922.

Application filed April 26, 1921. Serial No. 464,539.

*To all whom it may concern:*

Be it known that I, FRANK P. MANSFIELD, a citizen of the United States, and resident of Milwaukee, in the county of Milwaukee and State of Wisconsin, have invented certain new and useful Improvements in Gates for Grade Crossings; and I do hereby declare that the following is a full, clear, and exact description thereof.

My invention relates to a new and useful improvement in gates for grade crossings, and more particularly to the mechanism for operating the same.

The principal object of the invention is to provide a device of this kind, which is entirely automatic in its nature, and thoroughly reliable so that it will be unnecessary to employ an attendant for the same.

In carrying out my invention, I preferably employ a relay circuit which is connected to the respective rails in the block in which the crossing is located, and the train as soon as it enters the block, closes the circuit by forming an electric connection between the rails through the wheels and axle of the vehicles making up the train. The relay closes the main circuit and energizes a motor which closes the gate. The main circuit also includes the signalling device for warning vehicles approaching along a highway. As soon as the gate reaches its closed position, the circuit through the motor is interrupted, and a circuit is established through an electromagnet, which retains the gate in closed position. As soon as the gate commences to move toward its closed position lights are displayed thereon. Departure from the block interrupts the circuit through the relay, thereby interrupting the main circuit, and the gate is automatically restored to its open position.

With the above objects in view, my invention consists in certain details of construction which will now be described in connection with the accompanying drawings, in which:

Figure 1 is a front elevation of the gate in open position.

Figure 2 is a similar view with the gate in closed position.

Figure 3 is a plan view of the gate in closed position.

Figure 4 is a plan view of the gate in open position.

Figure 5 is a detail view showing the mechanism connecting the motor with the shaft on which the gate swings.

Figure 6 is a front elevation on a larger scale of the mechanism for operating the gate.

Figure 7 is a plan view of the gate operating mechanism on an enlarged scale.

Figure 8 is a front elevation of a portion of the operating means.

Figure 9 is a front elevation similar to Figure 8, but showing the parts in a different position, and Figure 10 is a diagrammatic view showing the relation of the relay and main circuits of the operating mechanism.

Referring more specifically to the drawing, the numeral 1 represents a gate which is keyed to the shaft 2, which is journaled in the frame 3. The gate is provided at its rear end with counter weights 4, which normally retain the gate in vertical or open position. Loosely mounted on the shaft 2, is a clutch member 5 having a tooth 6, which is adapted to engage a tooth 7 on the spur gear 8, which is journaled on the shaft 2. The teeth 6 and 7, are normally held in engagement by a lever 9, pivoted at one end to the frame and connected at its other end with a flexible cable 10, which passes over a sheave 11 and carries a weight 12. The weight 12 is sufficient to normally hold the teeth 6 and 7 in engagement so that when the gear 8 is rotated, the shaft 2 is rotated to close the gate.

The gear 8 is connected by means of intermediate gears 13 to the power shaft of an electric motor 14, so that under normal conditions when the motor 14 is energized it will rotate the shaft 2 to close the gate. The shaft 2 also carries an arm 15, the end of which is pivotally connected to a link 16, said link being connected at its other end to a wedge shaped block 17 mounted to slide on a track 18. When the shaft 2 is rotated to close the gate, the block 17 slides along its track until it engages the slide 19, which is connected with the lever 9. The slide 19 riding up on the inclined side of the block 17, swings the lever 9 to the position shown in dotted lines in Figure 7, disengaging the teeth 6 and 7.

When the train enters the block 20, as shown in Figure 10, the circuit will be established through the relay 21, which closes the contact points 22, and establishes the main circuit through the contacts 23 and 24 on the insulation blocks 25, the circuit being completed between the contact members 23 and 24 by a contact member 26 carried by the arm 15. The circuit being thus established through the motor 14, the latter is energized to rotate the shaft 2, and close the gate, the arm 15 being at the same time carried from the position shown in Figure 8 to that shown in Figure 9. At this time the contact member 26 will leave the contact 24 and ride onto the contact 27, thus interrupting the circuit through the motor and establishing a circuit through the electromagnet 28. The armature 29 carried on the arm 30 which is also secured to the shaft 2, will be then held by the magnet 28, to retain the shaft 2 and consequently the gate 1 in closed position.

It will be understood that the circuit through the motor 14, is interrupted and the circuit through the magnet 28 is established, substantially at the same time that the inclined surface of the block 17 moves the lever 9 laterally to disengage the teeth 6 and 7. The inertia of the motor and the gearing will be sufficient to carry the tooth 7 somewhat past the tooth 6 so that upon the gate being released it will be free to move back to its open position under the influence of the counter weights 4, and will be in position to be again operated by the motor 14 when the same is again energized.

As soon as the relay is operated to close the circuit through the motor, a branch circuit 34 will also be closed. This branch circuit operates a signal bell 32, which is carried by a post 31 supported at one side of the frame 3. A block 35 is also mounted on the frame 3, which carries contacts 36 and 37, which are connected with the main circuit and as soon as the arm 30 carried by the shaft 2 starts to move, when the gate is to be closed, the contacts 36 and 37 will be connected by the contact member 38 carried by said arm, and the circuit will be closed through the signal lights 39 carried at the end of the gate.

As soon as the train leaves the block, the relay circuit will be interrupted and consequently the contact points 22 will be opened. Thus interrupted, the main circuit through the signals will then be rendered inoperative and the armature 29 will be released from the electromagnet 28, and the counter weights 4 will operate to raise or open the gate.

From the foregoing description, it will be seen that the device which forms the subject matter of my invention, is entirely automatic in its nature and obviates the necessity of maintaining an attendant at a crossing in order to protect persons who use the highway. In fact, my device will be more reliable than any human agency since there is always a possibility of a human agent neglecting his duty.

I have shown and described one specific form in which my invention may be embodied, but it will be understood that various changes may be made in the structural details thereof, within the scope of the claims, without departing from the spirit of the invention.

I claim as my invention:

1. In combination, a gate for grade crossings normally open, an electric motor for closing the gate, a clutch normally operatively connecting the motor with said gate, means operable by an approaching train for energizing said motor, means for disconnecting said clutch when the gate reaches its closed position, means for interrupting the current through the motor, means for retaining the gate in closed position until the train has passed and subsequently releasing the same, and means for restoring the gate to open position when released.

2. In combination, a gate for grade crossings normally open, an electric motor for closing the gate, a clutch normally operatively connecting the motor with said gate, means operable by an approaching train for energizing said motor, means for disconnecting said clutch when the gate reaches its closed position, means for interrupting the current through the motor, an electromagnet operable when energized to retain the gate in closed position, means for energizing said magnet when the gate reaches its closed position, said last named means being interrupted by the departure of the train from the crossing, and means for returning the gate to open position as soon as the magnet is deenergized.

In testimony that I claim the foregoing I have hereunto set my hand at Milwaukee, in the county of Milwaukee and State of Wisconsin.

FRANK P. MANSFIELD.